No. 729,520. PATENTED MAY 26, 1903.
F. A. ROBBINS.
TRIPOD HEAD FOR PHOTOGRAPHIC INSTRUMENTS.
APPLICATION FILED MAY 12, 1902.
NO MODEL.

Witnesses:
W. B. Nourse.
E. N. Barker

Inventor,
Frank A. Robbins.
By A. A. Barker, Att'y.

No. 729,520.

Patented May 26, 1903.

UNITED STATES PATENT OFFICE.

FRANK A. ROBBINS, OF WORCESTER, MASSACHUSETTS.

TRIPOD-HEAD FOR PHOTOGRAPHIC INSTRUMENTS.

SPECIFICATION forming part of Letters Patent No. 729,520, dated May 26, 1903.

Application filed May 12, 1902. Serial No. 106,865. (No model.)

*To all whom it may concern:*

Be it known that I, FRANK A. ROBBINS, of the city and county of Worcester and State of Massachusetts, have invented certain new and useful Improvements in Tripod-Heads for Photographic Instruments; and I do hereby declare that the following is a full, clear, and exact description thereof, reference being had to the accompanying drawings, forming a part of this specification, and in which—

Figure 1:
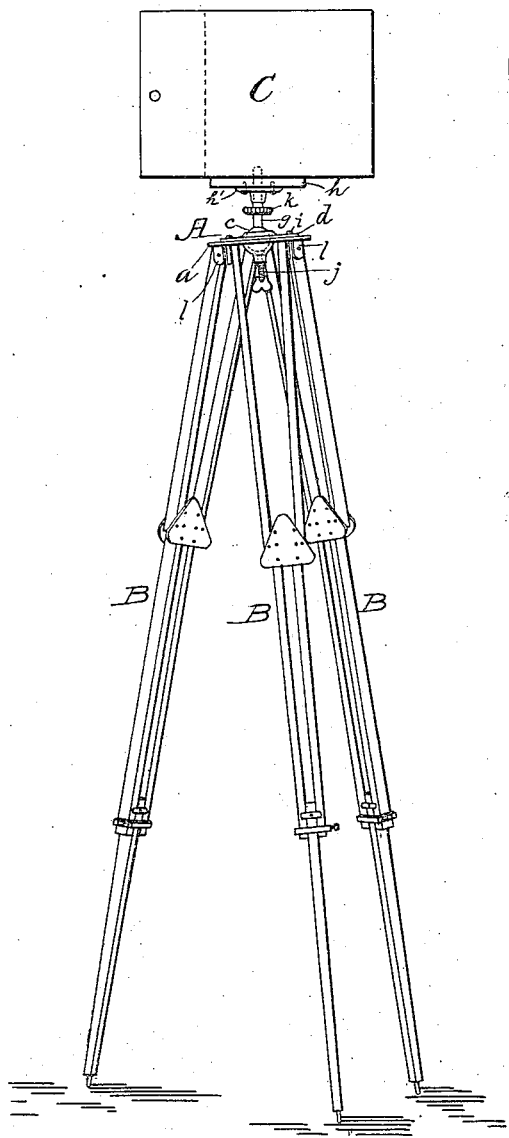
Figure 2:
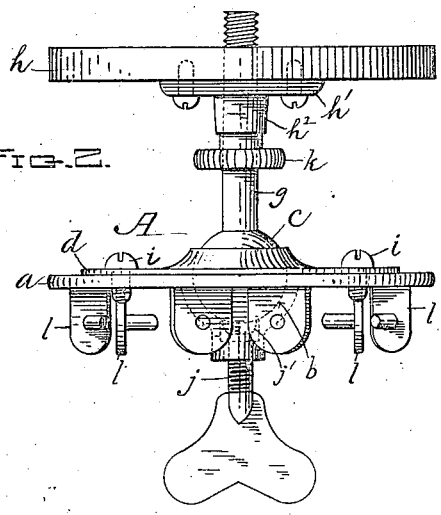
Figure 3:
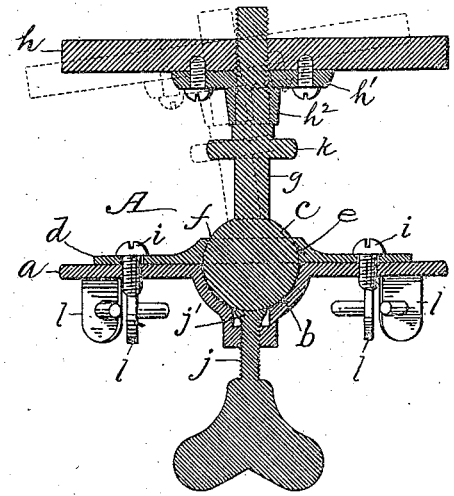

Figure 1 represents a photographic view-camera set upon a tripod having a head embodying my improvements. Fig. 2 represents, upon an enlarged scale, a side view of said improved tripod-head; and Fig. 3 represents, upon the same enlarged scale as Fig. 2, a central vertical section through the parts shown in Fig. 2, with the swivel camera-support shown in different positions by full and dotted lines.

The object of my invention is to provide a tripod-head for photographic instruments whereby the instrument may be leveled independent of the tripod, and it consists in providing the usual head, to which the tripod-legs are attached, with an adjustable swivel device upon which the instrument is mounted, as will be hereinafter more fully set forth.

To enable others to better understand the nature and purpose of my said invention, I will now proceed to describe it more in detail with reference to the accompanying drawings.

In said drawings, A represents the tripod-head, B B B the legs which support the same, and C a photographic camera which is mounted on said head. As my invention relates only to the tripod-head, the following description will be confined thereto. It is adapted to be used with any style or shape of legs and for supporting any kind of photographic camera or instrument. Said tripod-head is constructed as follows: The base-plate $a$, to which the upper ends of the legs B are attached, is provided with the central half-sphere-shaped socket $b$ in its upper side, in which a ball $c$ is adapted to fit, and over said ball is fitted a holding-plate $d$, having a concavity $e$ in its under side, which fits the upper surface of the ball. It also has a central vertical opening $f$ to receive the vertical post $g$, extending up from ball $c$ and upon whose upper end is mounted the disk or plate $h$, which fits against and forms a supporting-bed for the camera C when the latter is mounted on the head. Said disk or plate $h$ is preferably made of composition material and may be of any desired shape. Under said disk or plate is also preferably employed a metal plate $h'$, fastened to the upper disk or plate and having a central hub $h^2$, provided with a vertical opening to receive the screw end of post $g$, as is shown in the drawings. The screw end of the post extends a little above disk or plate $h$, as is shown in the drawings, to admit of the camera being screwed thereon. The plate $d$ is fastened to the usual tripod-head or base-plate $a$ in any suitable and convenient manner. In this instance it is shown as being fastened by means of the screws $i\ i$; but I do not limit myself thereto, as numerous ways may be adopted to accomplish the same purpose without departing from the scope of my invention. A vertical threaded opening is formed in the bottom of plate A, central with the spherical concavity formed therein, as previously described, and in said threaded opening is fitted a thumb-screw $j$, whose inner end is adapted to bear against the surface of ball $c$. Therefore with said ball fitted between the two concavities $b$ and $e$ in the plates $a$ and $d$, respectively, as previously described and shown in the drawings, it is obvious that when the thumb-screw $j$ is turned in it presses longitudinally against the spherical surface of the ball and clamps it between said end and the inner surface of the plate $d$ to hold said ball and the parts mounted thereon rigid, and when said thumb-screw is turned out the ball is released, so that it may turn in its bearings. To facilitate holding the ball more securely, the inner end of the thumb-screw $j$ is preferably provided with a head $j'$ and made concave in shape to fit the convex surface of the ball, and thereby produce a greater frictional holding-surface thereon. The ball is fitted loose in its bearings, so that it may easily turn when not held by the thumb-screw, as aforesaid. Said head $j'$ may be made integral with the post, as shown, or separate therefrom, as desired. The post $g$, extending upward from ball $c$, is provided with a threaded upper end to fit the usual threaded opening in the bottom of camera C. Said post may also be provided between said threaded end and the ball c with a milled collar k, whereby the operation of turning said threaded upper end into the opening in the camera may be facilitated. I do not limit myself thereto, however, as it is not an essential feature of my invention.

It will be apparent from the foregoing description and by reference to the drawings that a camera mounted on my improved tripod-head may be adjusted to a level position entirely independent of the level of the usual tripod-head (corresponding to the base-plate a) and of the positions of the legs of the tripod—as, for instance, the tripod may be set up in any position approximately level without thought to the leveling of the photographing instrument, even with the base-plate a considerably out of level, as is shown in Fig. 1, and said instrument afterward adjusted in a convenient and expeditious manner to a perfectly level position. Those using photographic instruments, especially in outdoor or field work, will readily appreciate the advantages thereby derived in the saving of time and trouble over the present method usually required of leveling said instrument by adjusting first one leg and then another of the tripod to bring the head to a level. My invention is of especial advantage for the use of amateur photographers and in leveling the camera upon uneven or rocky ground.

My improved device is simple in construction and, as above stated, easily and quickly manipulated and adds but little to the cost of the usual tripod-heads having no independent means of adjustment. Said device may be used upon a metal base-plate or head a, provided with the usual holding-ears l, projecting from its under side, to which the legs are attached, as is shown in the drawings, or said device may be attached to any tripod-head to which it may be adapted without departing from the principle of my invention.

While my invention is designed principally for photographic instruments, as previously described, it is equally applicable for engineers' levels and other instruments, and I therefore do not limit the application thereof to said use.

Having now described my invention, what I claim therein as new, and desire to secure by Letters Patent, is—

In a tripod, the base-plate a, having the socket b in its upper side and a central, vertical threaded opening at the bottom, also having the ears l projecting from its under side and a central, vertical opening at the top, means for fastening said plate d to plate a and thumb-screw j fitted to turn in the central, vertical, threaded, bottom opening in base-plate a, and whose inner end is adapted to bear against ball c, in combination with said ball c, the post g, extending up therefrom through collar h', said collar h', mounted on said post near its upper end, horizontal top plate h, arranged above said collar and having a central, vertical opening to receive post g, said post being threaded at its upper end and extended a short distance above said plate h, and means for fastening the collar h' to plate h, substantially as set forth and shown.

FRANK A. ROBBINS.

Witnesses:
 A. A. BARKER,
 W. B. NOURSE.